June 13, 1939.  R. POLINER  2,162,564

CONVERTIBLE MEAT GRINDER AND JUICE EXTRACTOR

Filed July 27, 1937  2 Sheets-Sheet 1

INVENTOR
Rose Poliner
BY
ATTORNEY

June 13, 1939.  R. POLINER  2,162,564

CONVERTIBLE MEAT GRINDER AND JUICE EXTRACTOR

Filed July 27, 1937  2 Sheets-Sheet 2

INVENTOR
Rose Poliner
BY
Zoltan Holochy
ATTORNEY

Patented June 13, 1939

2,162,564

UNITED STATES PATENT OFFICE 2,162,564

CONVERTIBLE MEAT GRINDER AND JUICE EXTRACTOR

Rose Poliner, New York, N. Y.

Application July 27, 1937, Serial No. 155,863

1 Claim. (Cl. 100—48)

This invention relates to new and useful improvements in a grinder, and has more particular reference to a convertible grinder and juice extractor.

The invention has for an object the construction of a device as mentioned which is characterized by the fact that it may be used as a meat grinder, and when several adjustments are made, in succession may be used as a juice extractor for various vegetables and fruits.

More specifically, the invention proposes to characterize the device by the fact that it has a tubular body having a hopper at the top portion of one end into which pieces of meat or fruits or vegetables may be engaged, and the other end of the tubular body being open, and the tubular body also having a funnel at the bottom. It is proposed to control the open end, or the funnel portion at the bottom, for determining whether the grinder operate on meat or extract juices.

More specifically, it is proposed to provide a removable solid disc extended across the open end of the tubular body, and a perforated element extended over the top of the funnel portion, and a controlled refuse opening for the refuse of crushed vegetables and fruits, operable when the device is used as a juice extractor.

An arrangement is proposed whereby the solid disc may be substituted for a perforated disc, and the perforated strip for a solid strip, and the refuse opening closed so that the device may be used in succession as a meat grinder.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:—

Fig. 11 illustrates a cutting blade adapted to be used in conjunction with the device when converted to grind meat or the like.

Fig. 12 is a sectional view taken on the line 12—12 of Fig. 11.

Fig. 13 is a blade used in conjunction with the device when converted to extract fruit juices.

Figure 1:
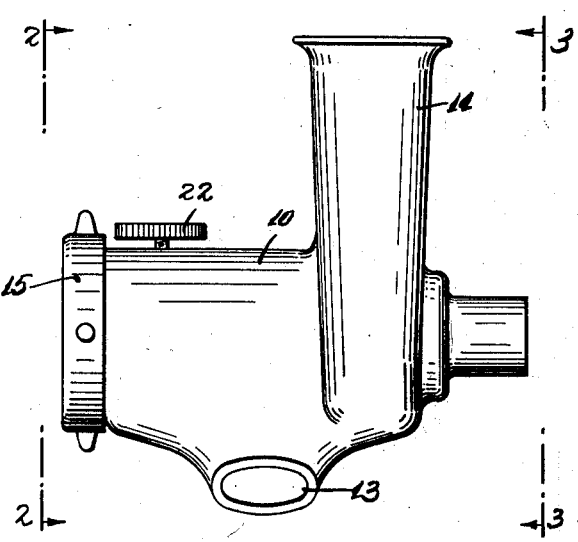
Fig. 1 is a side elevational view of a device constructed according to this invention.
Figure 2:
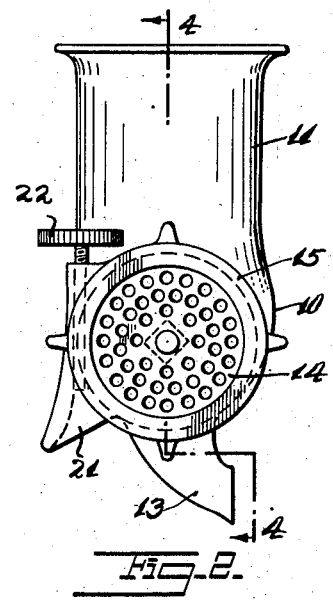
Fig. 2 is an end view looking in the direction of the line 2—2 of Fig. 1.
Figure 4:
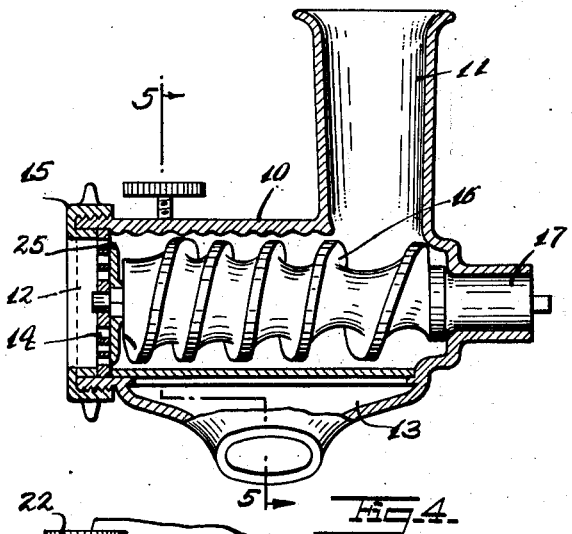
Fig. 4 is a vertical sectional view taken on the line 4—4 of Fig. 2.
Figure 3:
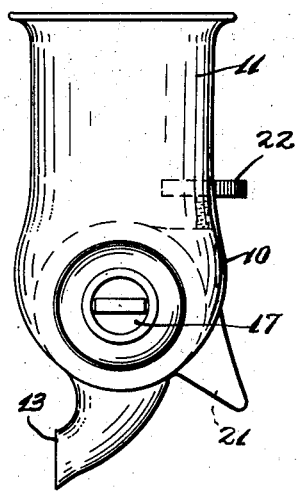
Fig. 3 is an end view looking in the direction of the line 3—3 of Fig. 1.
Figure 5:
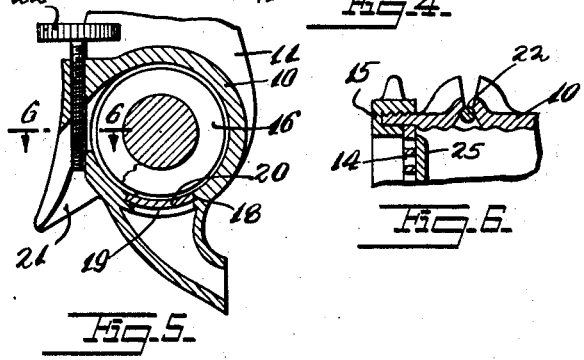
Fig. 5 is a fragmentary vertical sectional view taken on the line 5—5 of Fig. 4.
Figure 6:
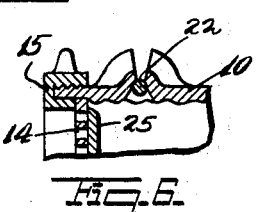
Fig. 6 is a fragmentary horizontal sectional view taken on the line 6—6 of Fig. 5.
Figure 7:
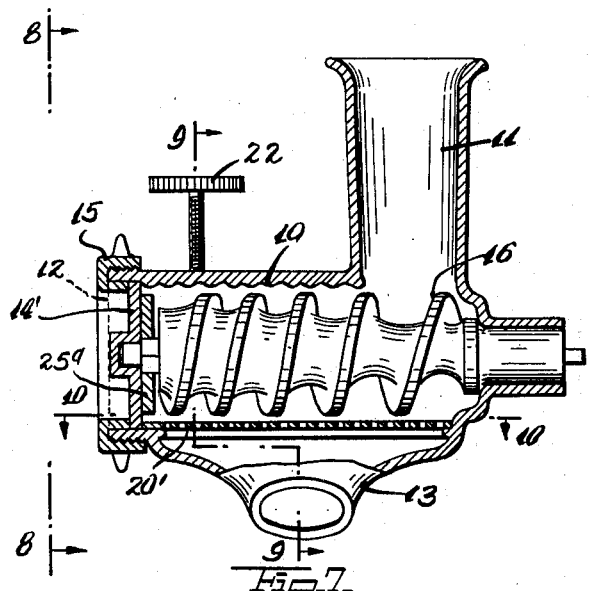
Fig. 7 is a view similar to Fig. 4 but illustrating the device converted to extract juices.
Figure 8:
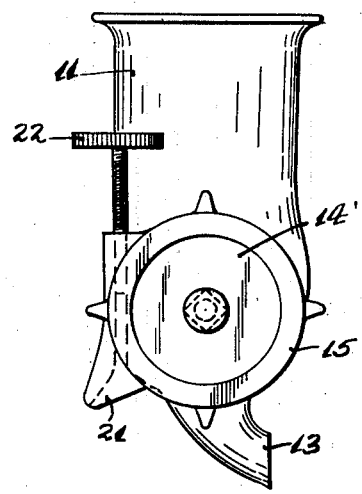
Fig. 8 is an end elevational view of Fig. 7 looking in the direction of the line 8—8 thereof.
Figure 10:
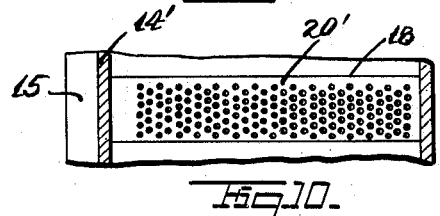
Fig. 10 is a fragmentary horizontal sectional view taken on the line 10—10 of Fig. 7.

The convertible meat grinder and juice extractor, according to this invention, comprises a tubular body 10 having a hopper portion 11 at the top portion thereof at one end, and at the other end having an open area 12. The tubular body also is provided with a funnel portion 13 at the bottom. A perforated disc 14 is extended across the open area 12. This disc is removably held in position by a cap 15 which threadedly engages on the end of the tubular body. A spiral cutter 16 is rotatively mounted through the tubular body and has a projecting end portion 17 by which it may be turned. A dove-tailed or similar groove 18 (see Fig. 5) extends longitudinally along the inner face of the tubular body 10 along the bottom portion thereof. The base wall of this groove is formed with a large opening 19 through the tubular body to communicate with the funnel 13.

A solid strip 20 is removably mounted in the groove 18 and is held fixedly in position by the perforated disc 14 and the cap 15 acting to hold the disc 14 in position. The tubular body 10 is also formed with a small refuse discharge opening 21 near the disc end thereof. A screw 22 is threadedly engaged on the tubular body 10 and arranged to control the refuse discharge opening 21. Normally, the screw 22 is in its lowered position, as illustrated in Figs. 1 to 6 inclusive so that the refuse opening 21 is normally closed.

The device thus far illustrated is adapted to grind meat or other materials. Small pieces of the material to be ground are dropped into the hopper and the cutter 16 is rotated by a suitable handle or other turning means. The pieces dropped into the tubular body will be forced against the side walls of the tubular body and so cut, and then as they reach the perforated disc 14 will be forced through the perforations thereof and so additionally cut and ground. A blade 25 is mounted on the end of the cutter 16 and acts against the perforated disc 14.

Figure 9:
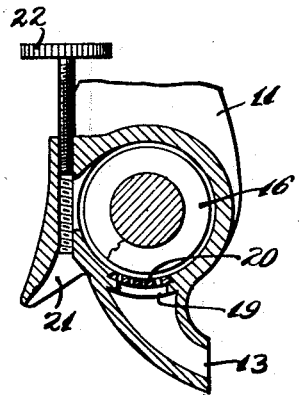
Fig. 9 is a frgmentary vertical sectional view taken on the line 9—9 of Fig. 7.

The convertible meat grinder and juice extractor may be converted to extractor juices in the following manner: A solid disc 14' is provided which may be substituted for the perforated disc 14. This is possible by first removing the threaded holding ring 15. Furthermore, the solid strip 20 is replaced by a perforated strip 20' adapted to have its perforations in communication with the opening 19. The screw 22 is turned so that it moves upwards to open the refuse passage 21, as illustrated in Fig. 9. A solid blade 25ª is mounted on the end of the cutter 16 and prevents the accumulation of pressed material against the solid disc 14'.

Now when material is dropped into the hopper 11 and the rotary cutter 16 caused to rotate, the material will be forced through the tubular body 10 and forced against the blade 25ª and the solid end disc 14 and against the inner faces of the walls of the tubular body and so crushed. The juices will be forced therefrom and will run through the aligned perforations of the strip 20' and the opening 19, and pass along and discharge from the funnel 13. The waste compressed material will discharge through the refuse opening 21.

Figures 11, 12, 13:
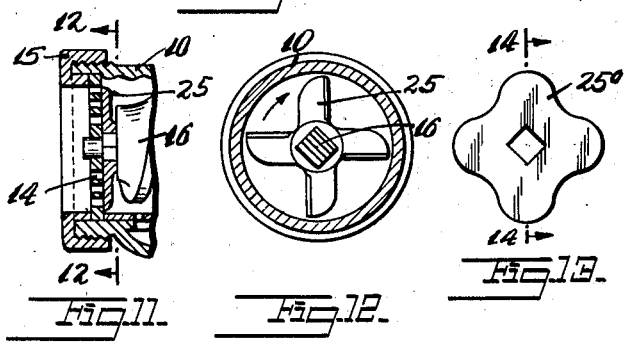

In Figs. 11 and 12 a blade cutter 25 is shown mounted on the end of the spiral cutter 16 and is cooperative with the perforated disc 14 for cutting particles being forced through the openings of said perforated disc. This blade cutter 25 will facilitate the cutting of meat and other particles which are being ground.

Figures 14, 15:
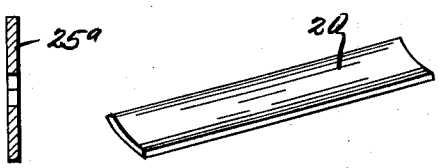
Fig. 14 is a sectional view taken on the line 14—14 of Fig. 13.
Fig. 15 is a perspective view of the solid strip used in the device.

Fig. 15 shows a perspective view of the solid strip 20, having bevelled edges to fit the dovetailed groove 18.

It is to be understood that this device may also be hand driven by a suitable handle or connected direct to a motor drive.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:—

In a convertible meat grinder and juice extractor, a tubular body having an open end, a hopper at the top portion of the other end, and a funnel at the bottom, a solid disc removably mounted across open end, said solid disc being removable to permit a perforated disc to be mounted across said open end when said grinder is used as a meat grinder, means for selectively holding said discs in position, a spiral cutter rotatively mounted through and of a diameter substantially equal to the internal diameter of said tubular body and having a projecting end by which it may be turned to direct materials placed in said body through said body from said hopper end to said open end, said body being formed along its bottom portion with a groove having an open base wall communicating with said funnel, a perforated strip removably mounted in said groove, said perforated strip being removable to permit a solid strip to be mounted within said groove when said grinder is used as a meat grinder, and said tubular body also having a closable discharge opening near the open end thereof through which the materials are adapted to pass after the juices have been extracted therefrom and passed through said funnel, whereby said grinder may be used as a juice extractor, when said perforated strip is mounted in said groove, said solid disc is mounted across said open end and said discharge opening is open and successively used as a meat grinder when said perforated strip is replaced by said solid strip, said solid disc is replaced by said perforated disc, and said discharge opening is closed so that said spiral cutter will direct meat through said body from said hopper end through said perforated disc, said disc holding means comprising an arcuate shoulder formed around the inside of said tubular body and against which an edge portion of said disc is adapted to abut, and a cap threadedly engaged upon said tubular body and abutting against said disc for holding it fixed against said shoulder, said groove being of dove-tailed form in transverse cross-section, and said strips being shaped so as to be engageable into said groove through said open end when said disc is disengaged therefrom and being engageable by said disc and maintained in position thereby.

ROSE POLINER.